(12) United States Patent
Maida et al.

(10) Patent No.: US 11,892,695 B2
(45) Date of Patent: *Feb. 6, 2024

(54) HYBRID ELECTRO-OPTIC WIRELINE CABLE

(71) Applicant: Halliburton Energy Services, Inc., Houston, TX (US)

(72) Inventors: John Laureto Maida, Houston, TX (US); Sudhir Kumar Gupta, Kingwood, TX (US); Michel Joseph LeBlanc, Houston, TX (US); Arabinda Misra, Houston, TX (US); Ramon Hernandez Marti, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,782

(22) Filed: Jun. 9, 2022

(65) Prior Publication Data

US 2022/0299723 A1    Sep. 22, 2022

Related U.S. Application Data

(63) Continuation of application No. 16/585,543, filed on Sep. 27, 2019, now Pat. No. 11,366,275.

(Continued)

(51) Int. Cl.
  *G02B 6/44* (2006.01)
  *G01V 8/16* (2006.01)
  (Continued)

(52) U.S. Cl.
  CPC .......... *G02B 6/4416* (2013.01); *E21B 47/135* (2020.05); *G01V 8/16* (2013.01);
  (Continued)

(58) Field of Classification Search
  CPC ........ G02B 6/4416; G02B 6/443; G01V 8/16; H01B 7/18; H01B 9/005; H01B 11/00; H04B 10/25
  See application file for complete search history.

(56) References Cited

U.S. PATENT DOCUMENTS 4,522,464 A * 6/1985 Thompson ........... G02B 6/4427
                                                           385/107
5,495,547 A   2/1996 Rafie et al.
(Continued)

FOREIGN PATENT DOCUMENTS

CN    202615925 U    12/2012
DE    3808663        8/1989
(Continued)

OTHER PUBLICATIONS

PCT Application Serial No. PCT/US2019/053632, International Search Report, dated Jan. 23, 2020, 4 pages.
(Continued)

*Primary Examiner* — Daniel Petkovsek
(74) *Attorney, Agent, or Firm* — DeLizio, Peacock, Lewin & Guerra, LLP

(57) ABSTRACT

A cable comprises a protective jacket and a plurality of conductor bundles symmetrically arranged within the protective jacket. The cable comprises optical fibers arranged within the protective jacket relative to the plurality of conductor bundles such that an orthogonal mode electrical field symmetry for the plurality of conductor bundles is retained.

13 Claims, 10 Drawing Sheets

Related U.S. Application Data

(60) Provisional application No. 62/740,911, filed on Oct. 3, 2018.

(51) Int. Cl.
*H04B 10/25* (2013.01)
*H01B 11/00* (2006.01)
*H01B 7/18* (2006.01)
*E21B 47/135* (2012.01)

(52) U.S. Cl.
CPC ............... *H01B 7/18* (2013.01); *H01B 11/00* (2013.01); *H04B 10/25* (2013.01); *G02B 6/443* (2013.01)

(56) References Cited

U.S. PATENT DOCUMENTS

| | | | |
|---|---|---|---|
| 5,555,338 A | 9/1996 | Haag et al. | |
| 6,510,103 B1 | 1/2003 | Knudsen et al. | |
| 7,324,730 B2 | 1/2008 | Varkey et al. | |
| 8,452,142 B1 | 5/2013 | Laws et al. | |
| 9,529,169 B2 | 12/2016 | Herbst | |
| 10,472,910 B2* | 11/2019 | Varkey | E21B 47/09 |
| 11,366,275 B2* | 6/2022 | Maida | G01V 8/16 |
| 2017/0268304 A1 | 9/2017 | Varkey | |
| 2020/0110235 A1 | 4/2020 | Maida et al. | |

FOREIGN PATENT DOCUMENTS

| | | |
|---|---|---|
| KR | 20110011320 A | 2/2011 |
| WO | 2020072326 A1 | 4/2020 |

OTHER PUBLICATIONS

PCT Application Serial No. PCT/US2019/053632, International Written Opinion, dated Jan. 23, 2020, 7 pages.
U.S. Appl. No. 16/585,543, Non-Final Office Action, dated Jan. 6, 2021, 21 pages.
U.S. Appl. No. 16/585,543, Final Office Action, dated Apr. 22, 2021, 14 pages.

* cited by examiner

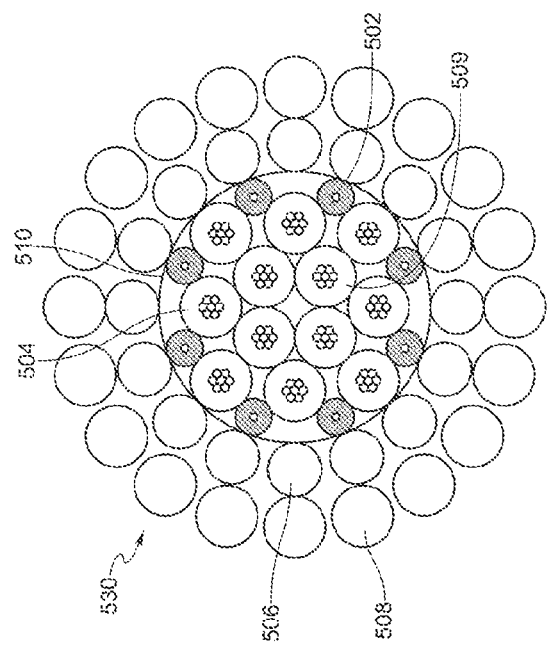
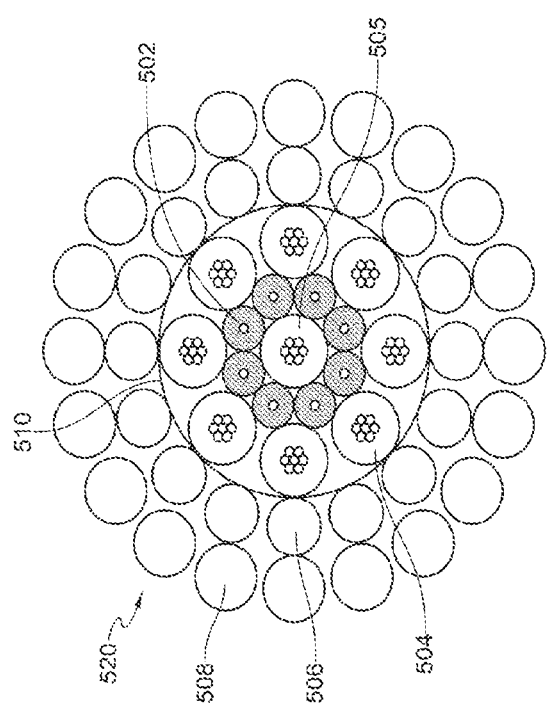
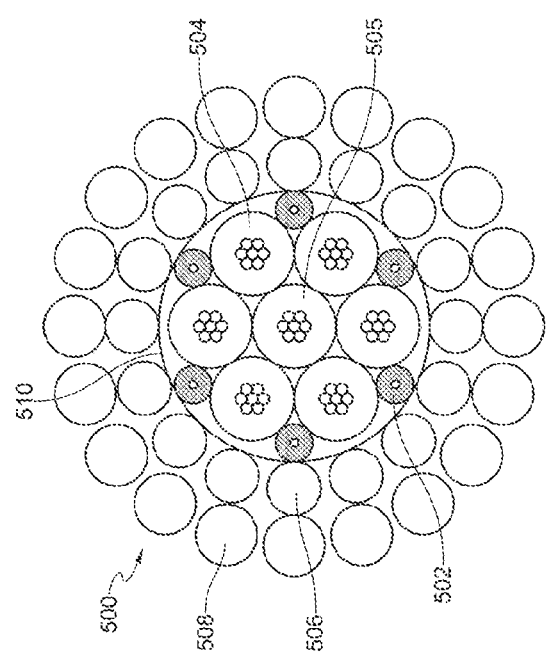

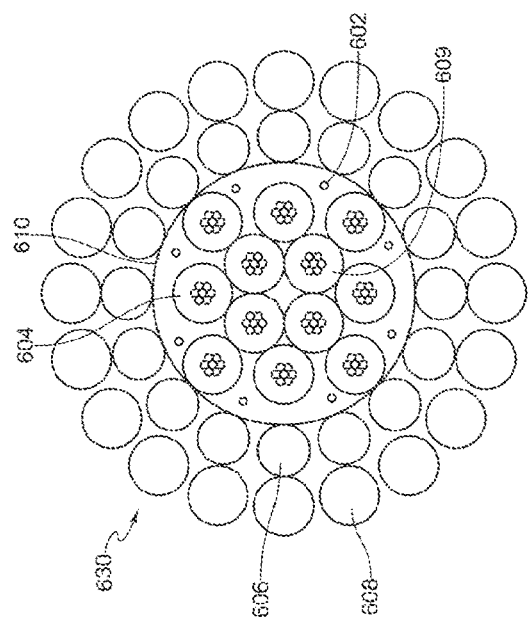
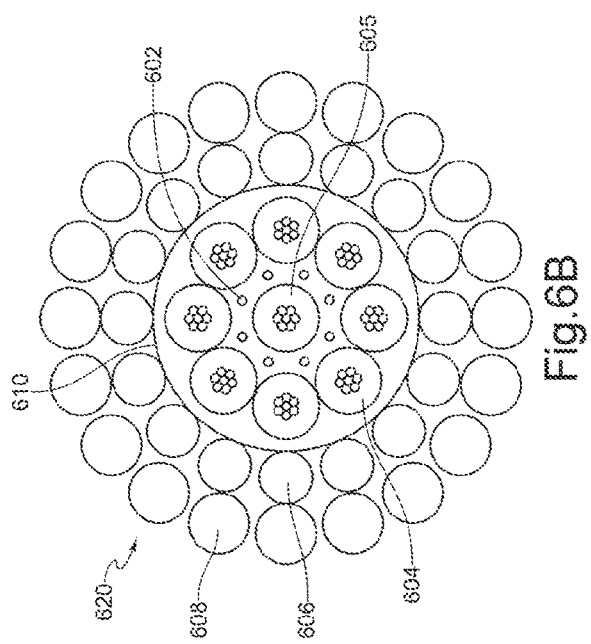
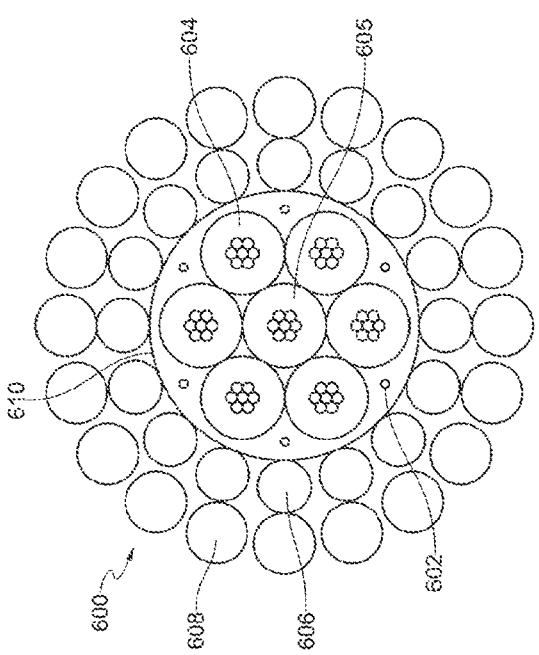

HYBRID ELECTRO-OPTIC WIRELINE CABLE

BACKGROUND

The disclosure generally relates to physical transmission media, and more particularly to a cable.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve different steps. These steps include drilling a wellbore through and/or into the subterranean formation at a desired well site, treating the wellbore to optimize production of hydrocarbons, and performing operations to produce and process the hydrocarbons from the subterranean formation. The process often utilizes measurements and other sensed data to determine characteristics of the formation.

Downhole logging tools are used in a wellbore to determine the characteristics of the subterranean formation. These logging tools are connected to the surface with electrical wires that power the tools as well as being used to communicate with the surface using electrical telemetry. One example of a logging tool is a Nuclear Magnetic Resonance (NMR) logging tools. An NMR logging tool is lowered to characterize the subsurface based on the magnetic interactions with subsurface material. By tuning a radio frequency (RF) pulse to the correct frequency or bandwidth, a resonant response can be elicited from hydrogen in formation materials to detect and characterize hydrocarbons in surrounding formations.

Other methods to obtain sensed data, such as distributed acoustic sensing (DAS), utilize optical fibers to determine the subterranean formation. DAS acquires measurements of seismic/acoustic energy in a wellbore originating from a seismic source at the surface of the wellbore (e.g., a vibrator truck, air gun, and/or explosives) to form a vertical seismic profile (VSP). Acoustic sensing based on DAS uses the Rayleigh backscatter property of a fiber's optical core and spatially detects disturbances that are distributed along a length of fiber positioned within a wellbore.

BRIEF DESCRIPTION OF THE DRAWINGS

Embodiments of the disclosure may be better understood by referencing the accompanying drawings.

FIG. 5A depicts a cross-sectional view of an example hybrid EO wireline cable having a seven conductor wireline design with optical fibers jacketed in metal microtubules interstitially placed among stranded conductor bundles.

FIG. 5B depicts a cross-sectional view of an example hybrid EO wireline cable having a nine conductor wireline design with optical fibers jacketed in metal microtubules interstitially placed among stranded conductor bundles.

FIG. 5C depicts a cross-sectional view of an example hybrid EO wireline cable having a twelve conductor wireline design without a central axis stranded conductor bundle and having optical fibers jacketed in metal microtubules interstitially placed among stranded conductor bundles.

FIG. 6A depicts a cross-sectional view of an example hybrid EO wireline cable having a seven conductor wireline design with bare optical fibers interstitially placed among stranded conductor bundles.

FIG. 6B depicts a cross-sectional view of an example hybrid EO wireline cable having a nine conductor wireline design with bare optical fibers interstitially placed among stranded conductor bundles.

FIG. 6C depicts a cross-sectional view of an example hybrid EO wireline cable having a twelve conductor wireline design without a central axis stranded conductor bundle and having bare optical fibers interstitially placed among stranded conductor bundles.

DESCRIPTION

Figure 1:
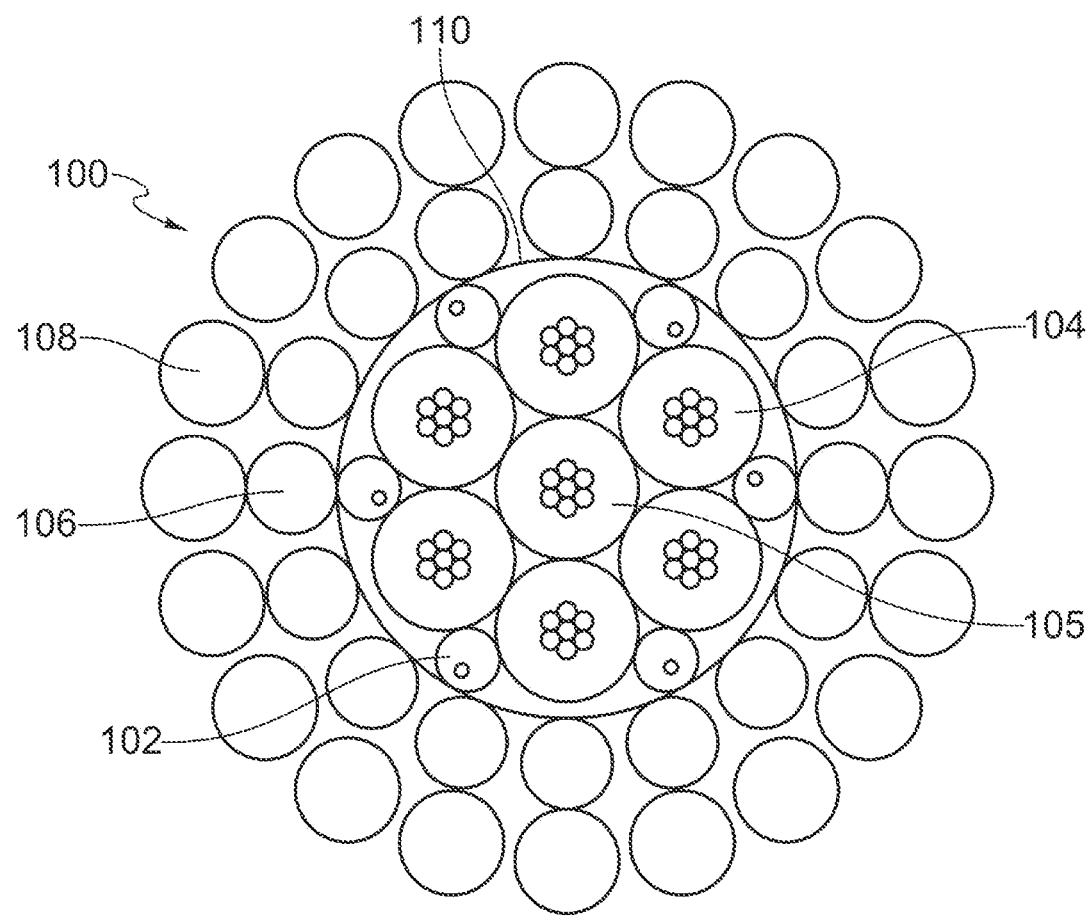
FIG. 1 depicts a cross-sectional view of an example hybrid EO wireline cable having a seven conductor wireline design with jacketed optical fibers interstitially placed among stranded conductor bundles.

The description that follows includes example cable, systems, methods, techniques, and program flows that embody aspects of the disclosure. However, it is understood that this disclosure may be practiced without these specific details. For instance, this disclosure refers to hybrid electro-optic (EO) cable and its use in a wireline downhole logging tool system and DAS system in illustrative examples. Aspects of this disclosure can also be applied to other blends of electro-optic cables and other methods of sensing. In other instances, well-known instruction instances, protocols, structures and techniques have not been shown in detail in order not to obfuscate the description.

Inserting optical fibers into the interstices among symmetrically arranged electrical wire bundles allows a hybrid EO cable to be concurrently used for electrical telemetry and optical fiber sensing without interference while still being usable in a wellbore environment. This hybrid EO cable maintains electric and magnetic field symmetry which allows an optimal electrical signaling rate through orthogonal propagation modes. By placing optical fibers symmetrically inside the interstitial spaces between electrical wire bundles, the hybrid EO cable would maintain its optimal signaling rate and avoids the mechanical and electrical limitations that would be introduced when combining electrical wires and optical fibers in a wireline cable. The cable can also enable power transmission and optical telemetry.

Furthermore, a logging system that uses the described hybrid EO wireline cable to determine the subterranean formation is disclosed.

Cables that only contain electrical wires cannot be used for distributed optical sensing or optical telemetry as they do not contain optical fibers. Wireline cables that only contain optical fibers however are not able to deliver power to electrical logging tools or be used to transmit data using electrical telemetry. In many instances, legacy wireline logging systems rely on electrical wireline cables to operate. As these cables fail or are retired from wear, hybrid EO wireline cables can bridge the transition because they use optical fibers but are also compatible with existing electrical wireline logging tools that use electrical telemetry systems.

Electrical wires may be composed of multiple stranded conductor bundles sheathed by an insulating jacket. In such a multi-conductor electrical telemetry system, the geometry of the placement of the conductor bundles is important as signal bandwidth depends on multiple signals being able to share the same transmission path. Symmetry in the electrical and magnetic fields of the conductor bundles allows orthogonality between propagation modes to be preserved, thus significantly reducing crosstalk over configurations that do not preserve orthogonality. This reduction in crosstalk allows multiple propagation modes to travel through the same conductor bundles or transmission paths, increasing the amount of information that can be transmitted through the wire at the same time.

Optical fibers, unlike metal wires, are prone to mechanical stresses and may lead to transmitted power loss, leading to signal power loss, resulting in reduced bandwidth and signal distance. Microbending occurs when mechanical force is applied to the optical fiber and creates small perturbations or distortions in the fiber along its length. Any physical deformations in the protective encasement or jacket for example can cause lower-order propagation modes to leak into higher-order propagation modes resulting in signal attenuation. One method to reduce microbending or other mechanical stress is to loosely jacket optical fibers within metal microtubes (loose tube construction) which provides additional physical support and protection without imparting microbend deformation. However, combining both fiber-in-metal-tube (FIMT), for example, with stranded electrical conductor bundles may limit the bandwidth of electrical telemetry by destroying symmetry of the electric and magnetic fields and the orthogonality between propagation modes.

Although an optical fiber, jacketed or bare, may be placed coaxially in the center of a wireline cable to preserve the electric and magnetic field symmetries that would allow orthogonal propagation modes, this may create excessive stress-strain on the fiber when the wireline cable is elongated by loading. While an optical fiber, jacketed or bare, may be placed in a radial helix around the center axis of a wireline cable, the center axis may not be preferred location within a wireline cable for the optical fiber. A center axis optical fiber may not be able to attain the strain-reducing helical configuration and can be subject to greater stress-strain. This may result in reduced fiber lifetime from accelerated crack growth.

Moreover, in addition to optimizing the wireline cable for electrical telemetry and optical telemetry, placing the optical fibers, jacketed or bare, in the interstitial location within the cross-sectional matrix mechanically optimizes the optical fibers for acoustic and vibration sensing. A helical optical fiber placement allows acoustic fields of differing incidence angles to optimally couple dynamic strains into the fiber, which is mostly sensitive as a linear interferometric sensor in its axial dimension. The optical fibers placed coaxially in the center of the wireline cable axis are also less sensitive to certain acoustic wave polarization states compared to the placement of fibers further away from the central axis and helically disposed. The placement of the optical fibers in the interstitial areas in contact with the protective jacket of the wireline cable increases acoustic sensitivity through frictional coupling.

Examples of Hybrid EO Cables

FIG. 1 depicts a cross-sectional view of an example hybrid EO wireline cable having a seven conductor wireline design with jacketed optical fibers interstitially placed among stranded conductor bundles. In FIG. 1, a wireline cable 100 includes six stranded conductor bundles 104 symmetrically arranged equidistant from a stranded conductor bundle 105 in the central axis. The six outer stranded conductor bundles 104 form a radial helix around the stranded conductor bundle 105 in the central axis. Six jacketed optical fibers 102 are placed within the interstitial areas of the wireline cable 100 equidistant from the stranded conductor bundle 105 in the central axis. In other embodiments, instead of the jacketed optical fibers wherein the optical fibers are loosely jacketed with metal microtubes, optical fibers jacketed with tight polymeric microtubes are placed within the interstitial areas. In some embodiments, optical fibers are jacketed loosely with polymeric microtubes. The plurality of jacketed optical fibers 102 are geometrically arranged to not disturb the electric and magnetic field symmetry of the stranded conductor bundles. FIG. 1 depicts an example arrangement having six jacketed optical fibers placed in the six interstitial areas created by the six stranded conductor bundles 105 and a protective jacket 110. The protective jacket 110 would further be sheathed in a first armor layer 106 and a second armor layer 108. There may be multiple possible arrangements for the seven conductor wireline design, such as each of the six outer conductor bundles being further away from the central bundle. Moreover, the hybrid EO cable may also use a different number of stranded conductor bundles, such as a nine conductor cable containing eight conductor bundles around a central bundle.

Figure 2:
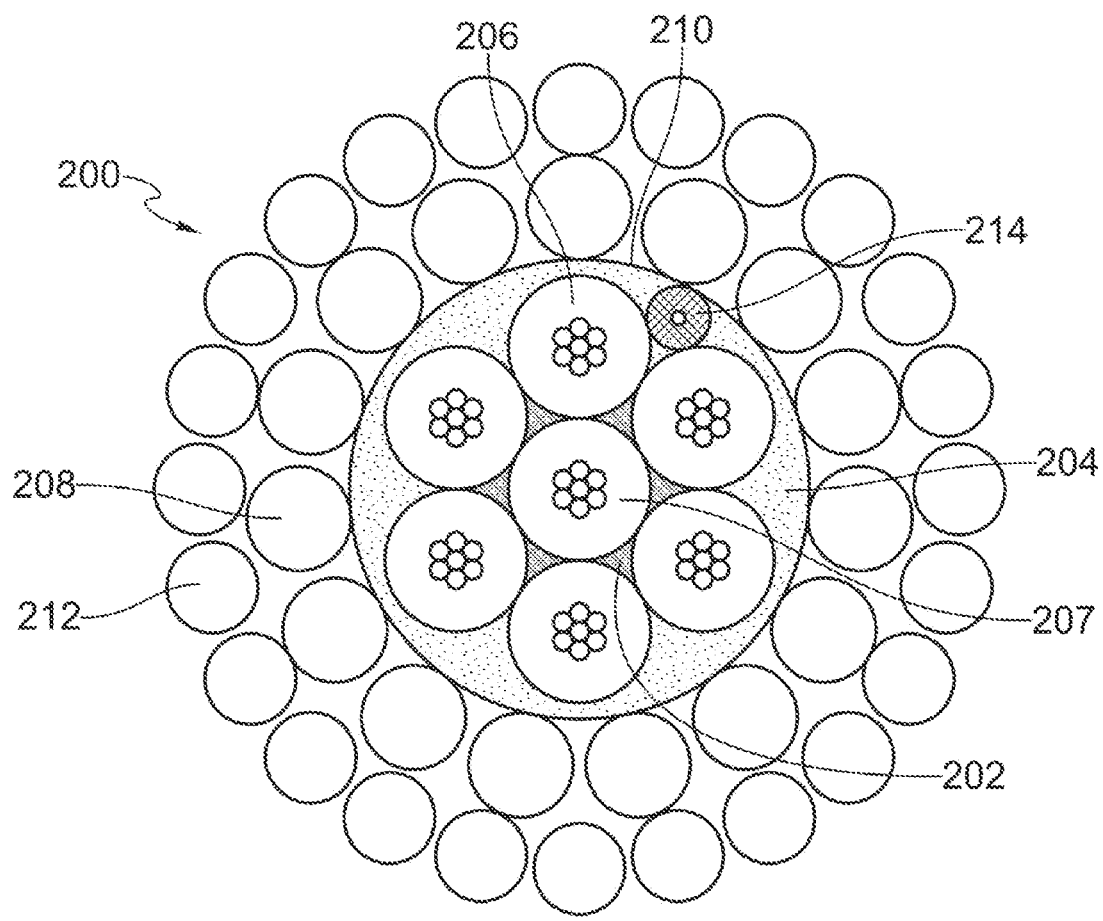
FIG. 2 depicts a cross-sectional view of an example hybrid EO wireline cable having one all-dielectric jacketed optical fiber placed in an interstice among stranded conductor bundles.

FIG. 2 depicts a cross-sectional view of an example hybrid EO wireline cable having at least one all-dielectric optical fiber disposed in an interstitial area relative to symmetrically arranged conductor bundles. In FIG. 2 a wireline cable 200 includes a plurality of stranded conductor bundles 206 symmetrically arranged equidistant from a stranded conductor bundle 207 in the central axis of the wireline cable 200 in a seven conductor wireline design. The six outer stranded conductor bundles 206 forms a radial helix around the stranded conductor bundle 207 in the central axis. At least one all-dielectric optical fiber 214 is placed within any of a plurality of inner interstitial areas 202 created between stranded conductor bundles 206 and stranded conductor bundle 207 in the central axis, or a plurality of outer interstitial areas 204 created between stranded conductor bundles 206 and a protective jacket 210. FIG. 2 depicts the interstitial areas 202, 204 as areas that are shaded. The all-dielectric optical fiber 214 is placed in at least one of the interstitial areas 202, 204 that does not disturb the balanced electric and magnetic field symmetry of the stranded conductor bundles. The protective jacket 210 would further be sheathed in a first armor layer 208 and a second armor layer 212. In some embodiments, the all-dielectric optical fibers may be sheathed with high temperature polymeric compounds, such as polyether ether ketone (PEEK), silicone/PFA, Liquid Crystal Polymer (LCP), Enhanced PTFE and other dielectric compounds.

There may be multiple possible arrangements for the seven conductor wireline design, such as each of the six outer conductor bundles being further away from the central bundle. Moreover, the hybrid EO cable may also use a different number of stranded conductor bundles, such as a nine conductor cable containing eight conductor bundles around a central bundle.

Figure 3:
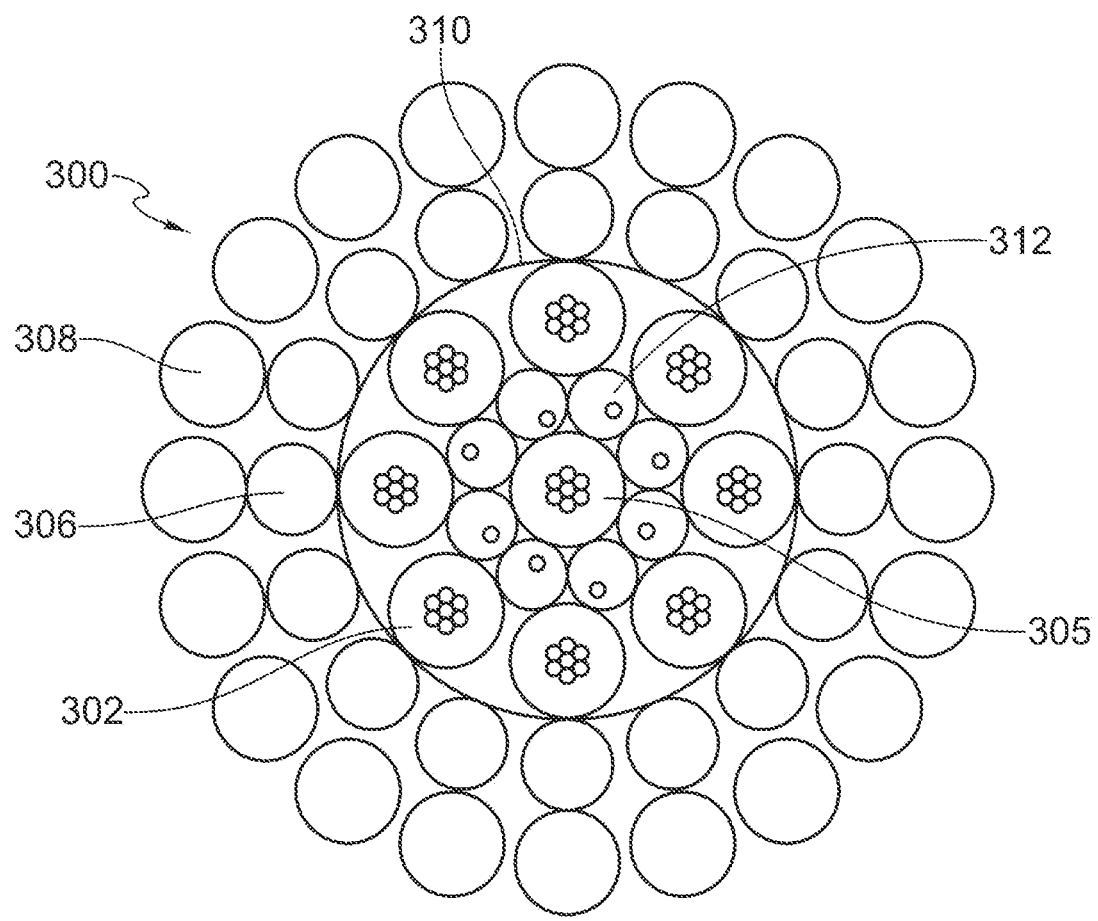
FIG. 3 depicts a cross-sectional view of an example hybrid EO wireline cable having a nine conductor wireline design with jacketed optical fibers interstitially placed among stranded conductor bundles.

FIG. 3 depicts a cross-sectional view of an example hybrid EO wireline cable having a nine conductor wireline design with jacketed optical fibers interstitially placed among stranded conductor bundles. In FIG. 3, a wireline cable 300 includes eight outer stranded conductor bundles 302 symmetrically arranged equidistant from a stranded central axis conductor bundle 305. The eight outer stranded conductor bundles 302 form a radial helix around the stranded central axis conductor bundle 305. Eight jacketed optical fibers 312 are placed within the interstitial areas between the outer stranded conductor bundles 302 and the central axis conductor bundle 305. In other embodiments, instead of the jacketed optical fibers wherein the optical fibers are loosely jacketed with metal microtubes, optical fibers jacketed with tight polymeric microtubes are placed within the interstitial areas. In some embodiments, optical fibers are jacketed loosely with polymeric microtubes. The jacketed optical fibers 312 are located substantially equidistant from the central axis conductor bundle 305. The jacketed optical fibers 312 are geometrically arranged to not disturb the electric or magnetic field symmetry of the stranded conductor bundles. To avoid disturbing the electric or magnetic field symmetry of the conductor bundles, the geometric arrangement of the jacketed optical fibers 312 is symmetric among the jacketed optical fibers and symmetric with respect to the stranded conductor bundles 302. The protective jacket 310 are sheathed in a first armor layer 306 and a second armor layer 308.

Figure 4:
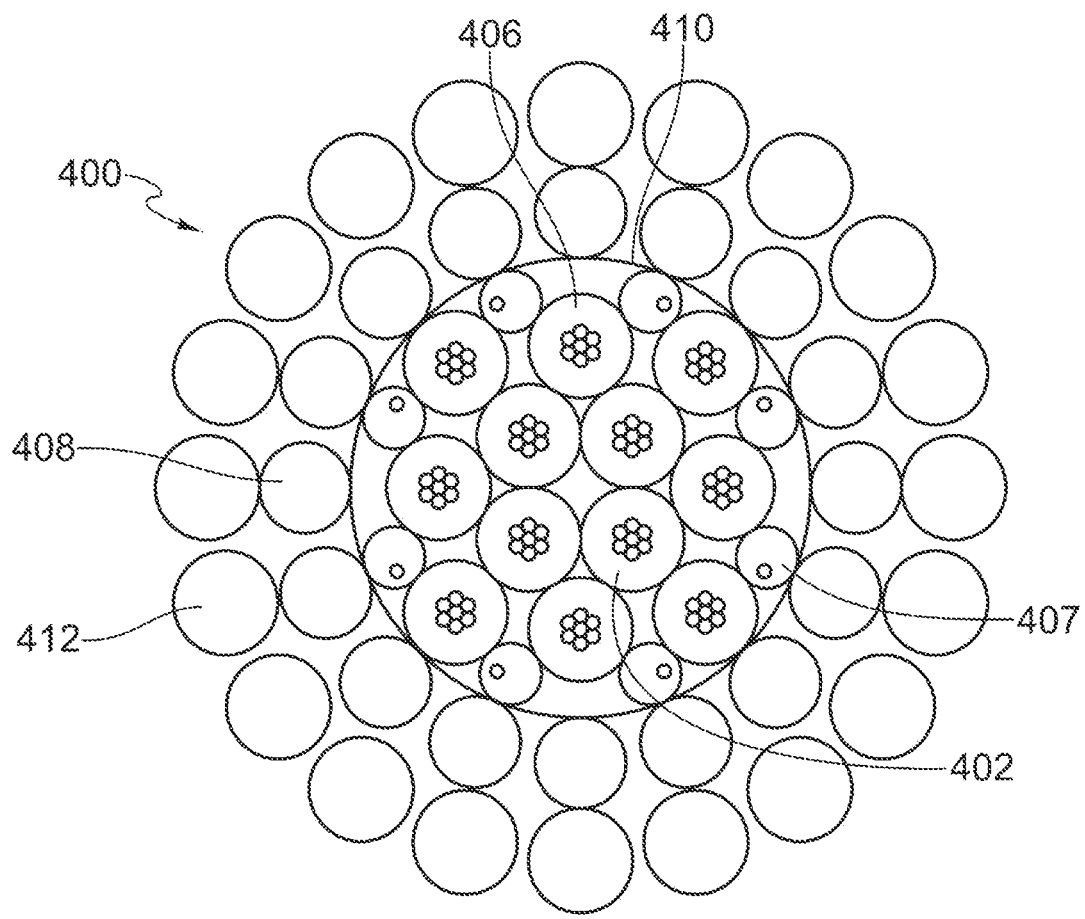
FIG. 4 depicts a cross-sectional view of an example hybrid EO wireline cable having a twelve conductor wireline design without a central axis stranded conductor bundle and having jacketed optical fibers interstitially placed among stranded conductor bundles.

The stranded conductor bundles can also be in a configuration that does not include a conductor bundle in the central axis, such as four bundles arranged in a square. FIG. 4 depicts a cross-sectional view of an example hybrid EO wireline cable having a twelve conductor wireline design without a central axis stranded conductor bundle and having jacketed optical fibers interstitially placed among stranded conductor bundles. In FIG. 4, a wireline cable 400 includes twelve stranded conductor bundles 404 symmetrically arranged equidistant from the central axis of the wireline cable 400. Instead of the central axis being occupied by a central axis strand, four inner stranded conductor bundles 402 occupy a central axis space of the cable 400. The eight outer stranded conductor bundles 406 form a radial helix around the four inner stranded conductor bundles 406. Eight jacketed optical fibers 407 are placed within the interstitial areas of the wireline cable 400 equidistant from the central axis of the wireline cable 400. In other embodiments, instead of the jacketed optical fibers wherein the optical fibers are loosely jacketed with metal microtubes, optical fibers jacketed with tight polymeric microtubes are placed within the interstitial areas. In some embodiments, optical fibers are jacketed loosely with polymeric microtubes. The jacketed optical fibers 407 are geometrically arranged to not disturb the electric and magnetic field symmetry of the stranded conductor bundles as mentioned in the description for FIG. 3. The protective jacket 410 would further be sheathed in a first armor layer 408 and a second armor layer 412.

In some embodiments, the jacketed optical fibers of various types of hybrid EO wireline cable described in FIGS. 1, 3, and 4 are jacketed with metal microtubules. FIG. 5A depicts a cross-sectional view of an example hybrid EO wireline cable having a seven conductor wireline design with optical fibers jacketed in metal microtubules interstitially placed among stranded conductor bundles. In FIG. 5A, a wireline cable 500 includes six stranded conductor bundles 504 symmetrically arranged equidistant from a stranded conductor bundle 105 in the central axis. The six outer stranded conductor bundles 504 forms a radial helix around the stranded conductor bundle 505 in the central axis. Six FIMTs 502 are placed within the interstitial areas of the wireline cable 500 equidistant from the stranded conductor bundle 505 in the central axis. The plurality of FIMTs 502 are geometrically arranged to not disturb the electric and magnetic field symmetry of the stranded conductor bundles. FIG. 5A depicts an example arrangement having six FIMTs placed in the six interstitial areas created by the six stranded conductor bundles 505 and a protective jacket 510. The protective jacket 510 would further be sheathed in a first armor layer 506 and a second armor layer 508.

FIG. 5B depicts a cross-sectional view of an example hybrid EO wireline cable having a nine conductor wireline design with optical fibers jacketed in metal microtubules interstitially placed among stranded conductor bundles. In FIG. 5B, a wireline cable 520 includes eight outer stranded conductor bundles 504 symmetrically arranged equidistant from a stranded central axis conductor bundle 505. The eight outer stranded conductor bundles 504 form a radial helix around the stranded central axis conductor bundle 505. Eight FIMTs 502 are placed within the interstitial areas between the outer stranded conductor bundles 504 and the central axis conductor bundle 505. The FIMTs 502 are located substantially equidistant from the central axis conductor bundle 505. The FIMTs 502 are geometrically arranged to not disturb the electric or magnetic field symmetry of the stranded conductor bundles. To avoid disturbing the electric or magnetic field symmetry of the conductor bundles, the geometric arrangement of the FIMTs 502 is symmetric among the jacketed optical fibers and symmetric with respect to the stranded conductor bundles 504. The protective jacket 510 are sheathed in a first armor layer 506 and a second armor layer 508.

FIG. 5C depicts a cross-sectional view of an example hybrid EO wireline cable having a twelve conductor wireline design without a central axis stranded conductor bundle and having optical fibers jacketed in metal microtubules interstitially placed among stranded conductor bundles. In FIG. 5C, a wireline cable 530 includes twelve stranded conductor bundles 504 symmetrically arranged equidistant from the central axis of the wireline cable 530. Instead of the central axis being occupied by a central axis strand, four inner stranded conductor bundles 509 occupy a central axis space of the cable 530. The eight outer stranded conductor bundles 504 form a radial helix around the four inner stranded conductor bundles 509. Eight FIMTs 502 are placed within the interstitial areas of the wireline cable 530 equidistant from the central axis of the wireline cable 530. The FIMTs 502 are geometrically arranged to not disturb the electric and magnetic field symmetry of the stranded conductor bundles as mentioned in the description for FIG. 5B. The protective jacket 510 would further be sheathed in a first armor layer 506 and a second armor layer 508.

In some embodiments, the optical fibers of various types of hybrid EO wireline cable described in FIGS. 1, 3, and 4 are not jacketed but are bare optical fibers. FIG. 6A depicts a cross-sectional view of an example hybrid EO wireline cable having a seven conductor wireline design with bare optical fibers interstitially placed among stranded conductor bundles. In FIG. 6A, a wireline cable 600 includes six stranded conductor bundles 604 symmetrically arranged equidistant from a stranded conductor bundle 605 in the central axis. The six outer stranded conductor bundles 604 forms a radial helix around the stranded conductor bundle 605 in the central axis. Six bare optical fibers 602 are placed within the interstitial areas of the wireline cable 600 equidistant from the stranded conductor bundle 605 in the central axis. The plurality of bare optical fibers 602 are geometrically arranged to not disturb the electric and magnetic field symmetry of the stranded conductor bundles. FIG. 6A depicts an example arrangement having six bare optical fibers placed in the six interstitial areas created by the six stranded conductor bundles 605 and a protective jacket 610. The protective jacket 610 would further be sheathed in a first armor layer 606 and a second armor layer 608.

FIG. 6B depicts a cross-sectional view of an example hybrid EO wireline cable having a nine conductor wireline design with bare optical fibers interstitially placed among stranded conductor bundles. In FIG. 6B, a wireline cable 620 includes eight outer stranded conductor bundles 604 symmetrically arranged equidistant from a stranded central axis conductor bundle 605. The eight outer stranded conductor bundles 604 form a radial helix around the stranded central axis conductor bundle 605. Eight bare optical fibers 602 are placed within the interstitial areas between the outer stranded conductor bundles 604 and the central axis conductor bundle 605. The bare optical fibers 602 are located substantially equidistant from the central axis conductor bundle 605. The bare optical fibers 602 are geometrically arranged to not disturb the electric or magnetic field symmetry of the stranded conductor bundles. To avoid disturbing the electric or magnetic field symmetry of the conductor bundles, the interstices may also be filled with dielectric "dummy" filler strands to maintain mechanical symmetry across the cable as well as to form an even distribution of dielectric mass and dielectric constant to create capacitive symmetry across the cable. The geometric arrangement of the bare optical fibers 602 and/or dummy filler strands is symmetric among the bare optical fibers and symmetric with respect to the stranded conductor bundles 604. The protective jacket 610 are sheathed in a first armor layer 606 and a second armor layer 608.

FIG. 6C depicts a cross-sectional view of an example hybrid EO wireline cable having a twelve conductor wireline design without a central axis stranded conductor bundle and having bare optical fibers interstitially placed among stranded conductor bundles. In FIG. 6C, a wireline cable 630 includes twelve stranded conductor bundles 604 symmetrically arranged equidistant from the central axis of the wireline cable 630. Instead of the central axis being occupied by a central axis strand, four inner stranded conductor bundles 609 occupy a central axis space of the cable 630. The eight outer stranded conductor bundles 604 form a radial helix around the four inner stranded conductor bundles 609. Eight bare optical fibers 602 are placed within the interstitial areas of the wireline cable 630 equidistant from the central axis of the wireline cable 630. The bare optical fibers 602 are geometrically arranged to not disturb the electric and magnetic field symmetry of the stranded conductor bundles. To avoid disturbing the electric or magnetic field symmetry of the conductor bundles, the interstices may also be filled with dielectric "dummy" filler strands to maintain mechanical symmetry across the cable as well as to form an even distribution of dielectric mass and dielectric constant to create capacitive symmetry across the cable. The geometric arrangement of the bare optical fibers 602 and/or dummy filler strands is symmetric among the bare optical fibers and symmetric with respect to the stranded conductor bundles 604 similar to the arrangement mentioned in the description for FIG. 6B. The protective jacket 610 would further be sheathed in a first armor layer 606 and a second armor layer 608.

Figure 7:
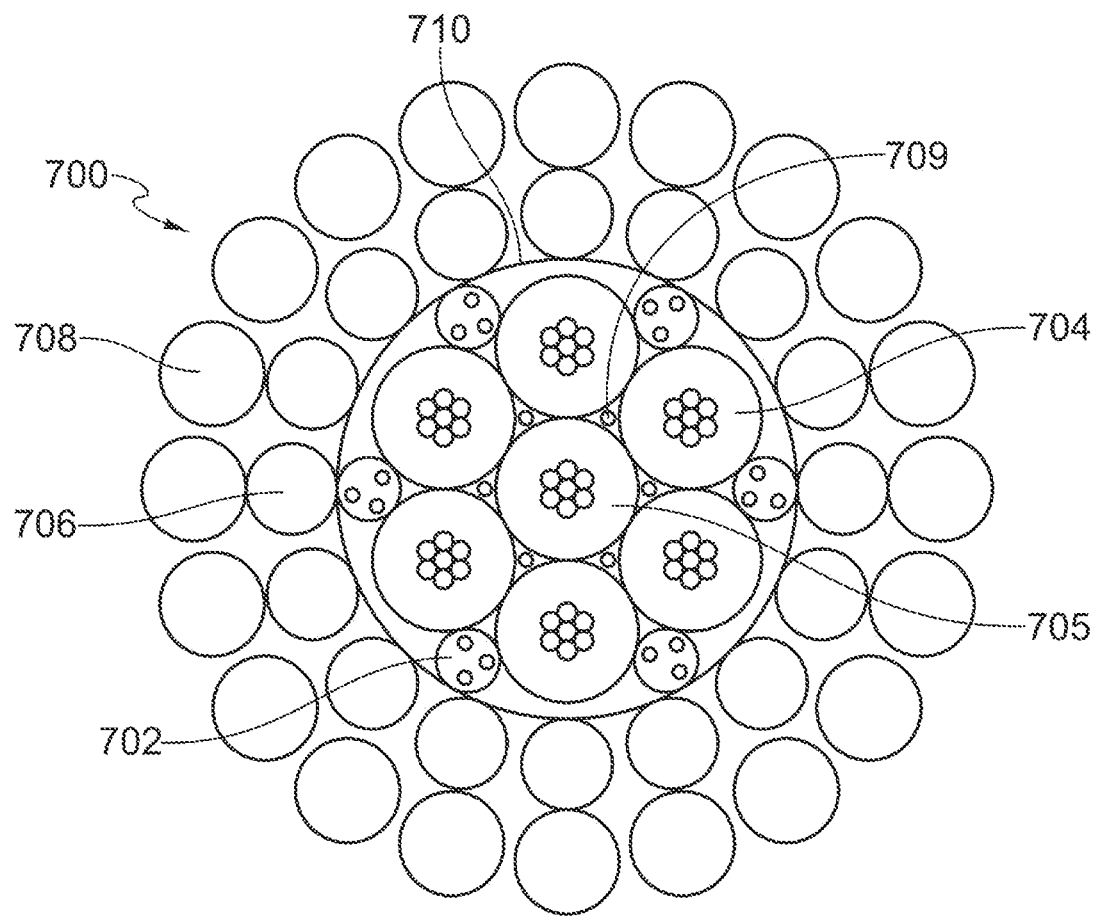
FIG. 7 depicts a cross-sectional view of an example hybrid EO wireline cable having a seven conductor wireline design with both bare optical fibers and jacketed optical fibers having multiple optical fibers within each jacket and interstitially placed among stranded conductor bundles.

In other embodiments, both jacketed and bare optical fibers are used in the hybrid EO wireline cable. Moreover, multiple strands of optical fibers may be contained within each jacket. FIG. 7 depicts a cross-sectional view of an example hybrid EO wireline cable having a seven conductor wireline design with both bare optical fibers and jacketed optical fibers having multiple optical fibers within each jacket and interstitially placed among stranded conductor bundles. In FIG. 7, a wireline cable 700 includes six stranded conductor bundles 704 symmetrically arranged equidistant from a stranded conductor bundle 705 in the central axis. The six outer stranded conductor bundles 704 forms a radial helix around the stranded conductor bundle 705 in the central axis. Six jacketed optical fibers 702 are placed within the interstitial areas of the wireline cable 700 equidistant from the stranded conductor bundle 705 in the central axis. Each of the jacketed optical fibers 702 contain multiple stands of optical fiber. Moreover, six bare optical fibers 709 are placed within the interstitial areas between the outer stranded conductor bundles 704 and the central axis conductor bundle 705. The plurality of jacketed optical fibers 702 and bare optical fibers 709 are geometrically arranged to not disturb the electric and magnetic field symmetry of the stranded conductor bundles. A protective jacket 710 is further sheathed in a first armor layer 706 and a second armor layer 708.

For all of the example wirelines depicted in FIGS. 1-7, The stranded conductor bundles may be arranged in a way that results in varying degrees of bandwidth available to be preserved. The optical fibers, jacketed or bare, may be arranged symmetrically around the inner interstitial areas or other interstitial areas created between various elements of the cable that would preserve symmetry of the electrical and magnetic fields and retain orthogonal propagation modes. In some embodiments the metal microtubes of FIMTs may be sheathed in insulated or uninsulated buffer. The numbers of conductor bundles and microtubes with optical fibers in a wireline cable can vary in different implementations that adhere to the geometric arrangements described above. FIGS. 1-7 provide examples that illustrate just some of the possible variations in configuration that adhere to the geometric arrangement specified.

Example Systems

Figure 8:
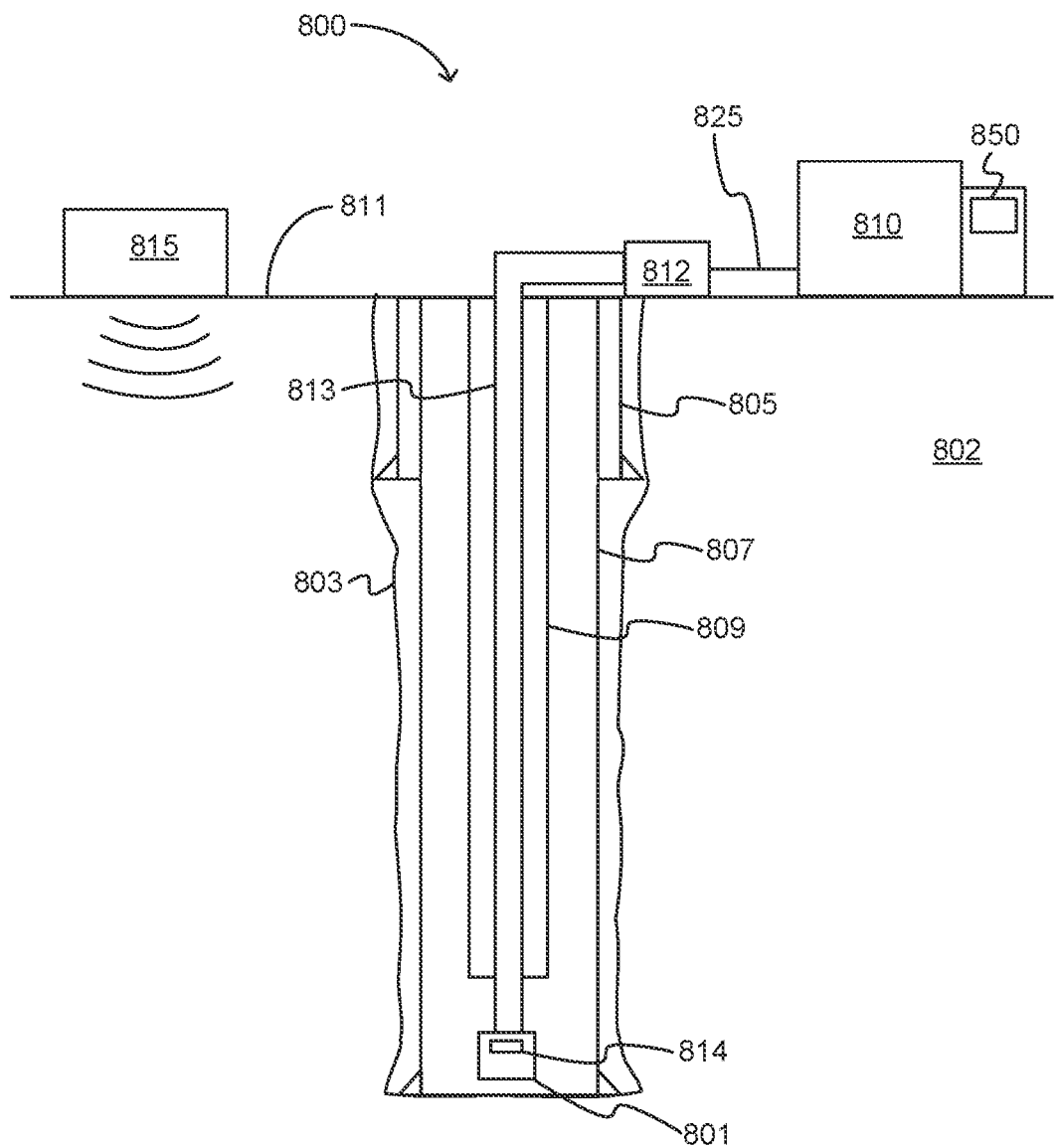
FIG. 8 depicts a wireline system that that uses a hybrid EO cable, e.g. a system used for DAS.

FIG. 8 depicts a system 800 that that uses a hybrid EO cable, e.g. a system used for DAS. As depicted, a wellbore 803 has been drilled in a subterranean formation 802. The wellbore 803 can be a cased wellbore, e.g. a completed well (i.e. a well ready for production or injection following a drilling process) having a surface casing 805, a production casing 807 inside the surface casing 805, and a tubing 809 inside the production casing 807. Alternatively, although not depicted, the wireline system 800 could be deployed in an open hole, i.e. a wellbore without casing or cement, in a partially cased and/or cemented wellbore, or in a wellbore 803 having not tubing or less casing layers.

The wireline system 800 includes a hybrid EO wireline cable 813 having optical fiber(s) as described in examples above. The wireline system 800, when used for DAS, can detect seismic disturbances generated by a seismic source 815 on an earth surface 811. As such, the wireline system 800 can include a signal interrogation system 812 that includes a DAS interrogator. In some embodiments, the DAS interrogator in the signal interrogation system 812 can be directly coupled to the optical fiber(s) of the hybrid EO wireline cable 813. Alternatively, the DAS interrogator can be coupled to a fiber stretcher module in the signal interrogation system 812, wherein the fiber stretcher module is coupled to the optical fiber(s) of the hybrid EO wireline cable 813. The signal interrogation system 812 can receive DAS measurement values taken from and/or transmitted along the length of the optical fiber(s) of the hybrid EO wireline cable 813. In addition, the signal interrogation system 812 can receive DAS measurement values from a bottom hole gauge carrier 814 attached to the bottom of the hybrid EO wireline cable 813 that transmits measurements through the optical fiber(s) of the hybrid EO wireline cable 813. In some embodiments, the bottom hole gauge carrier 814 can include a pressure temperature gauge and can be inside of or replaced by one or more downhole logging tools 801. Examples of downhole logging tools 801 include an NMR tool, a pulsed neutron tool, an electromagnetic tool, an acoustic tool, a sampling tool, or the like.

The DAS interrogator of the signal interrogation system 812 can be electrically connected to a digitizer to convert optically-transmitted measurements into digitized measurements. A computing device 810 can collect the digitized measurements from the signal interrogation system 812 using a connector 825. The computing device can have one or more processors and a memory device to analyze the measurements and graphically represent analysis results on the display device 850. In addition, the computing device 810 can communicate with components attached to the hybrid EO wireline cable 816, including through the optical fiber(s). For example, the computing device 810 can send control signals to the bottom hole gauge carrier 814 to modify gauge measurement parameters or send signals to control the downhole logging tools 801. Additionally, in some embodiments, at least one processor and memory device can be located downhole for the same purposes. With the hybrid EO wireline cable 813 positioned inside a portion of the wellbore 803, the signal interrogation system 812 can obtain information associated with the subterranean formation 802 based on seismic/acoustic disturbances (e.g. seismic disturbances caused by the seismic source 815).

As stated above, in some embodiments, the bottom hole gauge carrier 814 can be inside of or replaced by downhole logging tool 801. The hybrid EO wireline cable 816 supplies power to the logging tool 801 and/or provides communications between the logging tool 801 and the computing device 810 positioned at the surface 811, either directly or via the signal interrogation system 812. The communication may be done optically through the optical fiber(s) of the hybrid EO wireline cable 816 or electrically through the metal conductor bundles of the hybrid EO wireline cable 816.

Although the EO hybrid cable allows for concurrent use of the conductor bundles and fiber optics, the EO hybrid cable can be used in scenarios that use only one of the signal mediums. In some cases, a wireline system may include one type of downhole logging tool. In other cases, there may be one or more logging tools connected to the EO hybrid cable, at least one of which having one or more devices or components including but not limited to accelerator porosity sonde (APS), Litho-density sonde (LDS), natural gamma ray sonde (NGS), high resolution laterolog array tool (HRLA), phasor dual induction-spherically focused resistivity tool (DIT), magnetic susceptibility sonde (MSS-B), dipole sonic imager (DSI), ultrasonic borehole imager (UBI), and modular temperature tool (MTT). These and other logging tools may use electrical telemetry and/or optical telemetry to communicate data. Furthermore, the hybrid EO wireline cable 816 may be used for other sensing methodologies including microseismic monitoring, leak/sound detection, distributed temperature (DTS), distributed strain/pressure (DSS/DPS) measurements. The hybrid EO wireline cable 816 may be used to perform wireline or slickline logging operations before some or all the tubulars have been secured within the wellbore, and/or before the wellbore 803 is completed. As another example, multiple seismic sources 815 may be used in conjunction with the wireline system.

Figure 9:
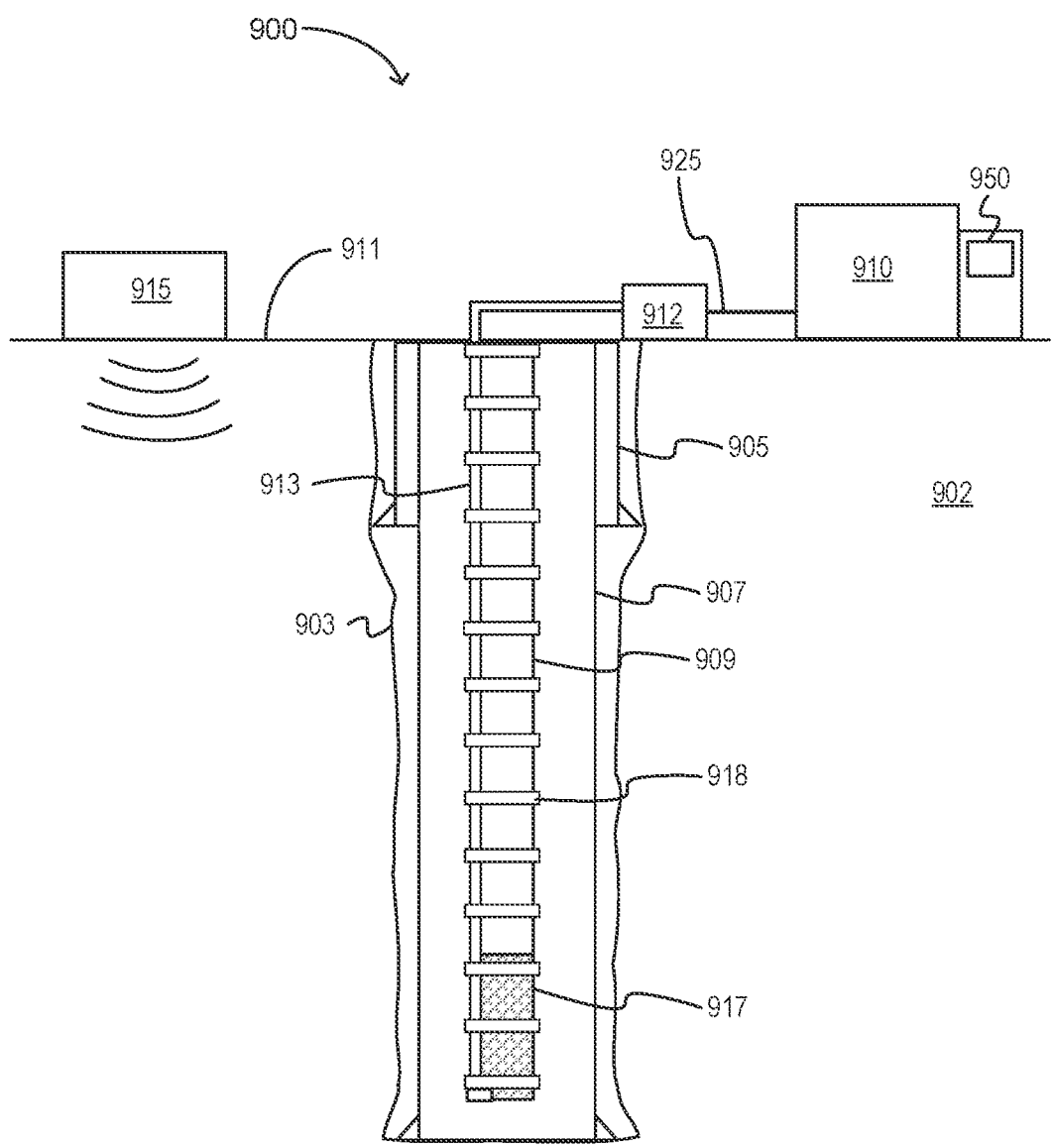
FIG. 9 depicts an example completion system that uses a hybrid EO cable fixed to the outside of a tubing.
Figure 10:
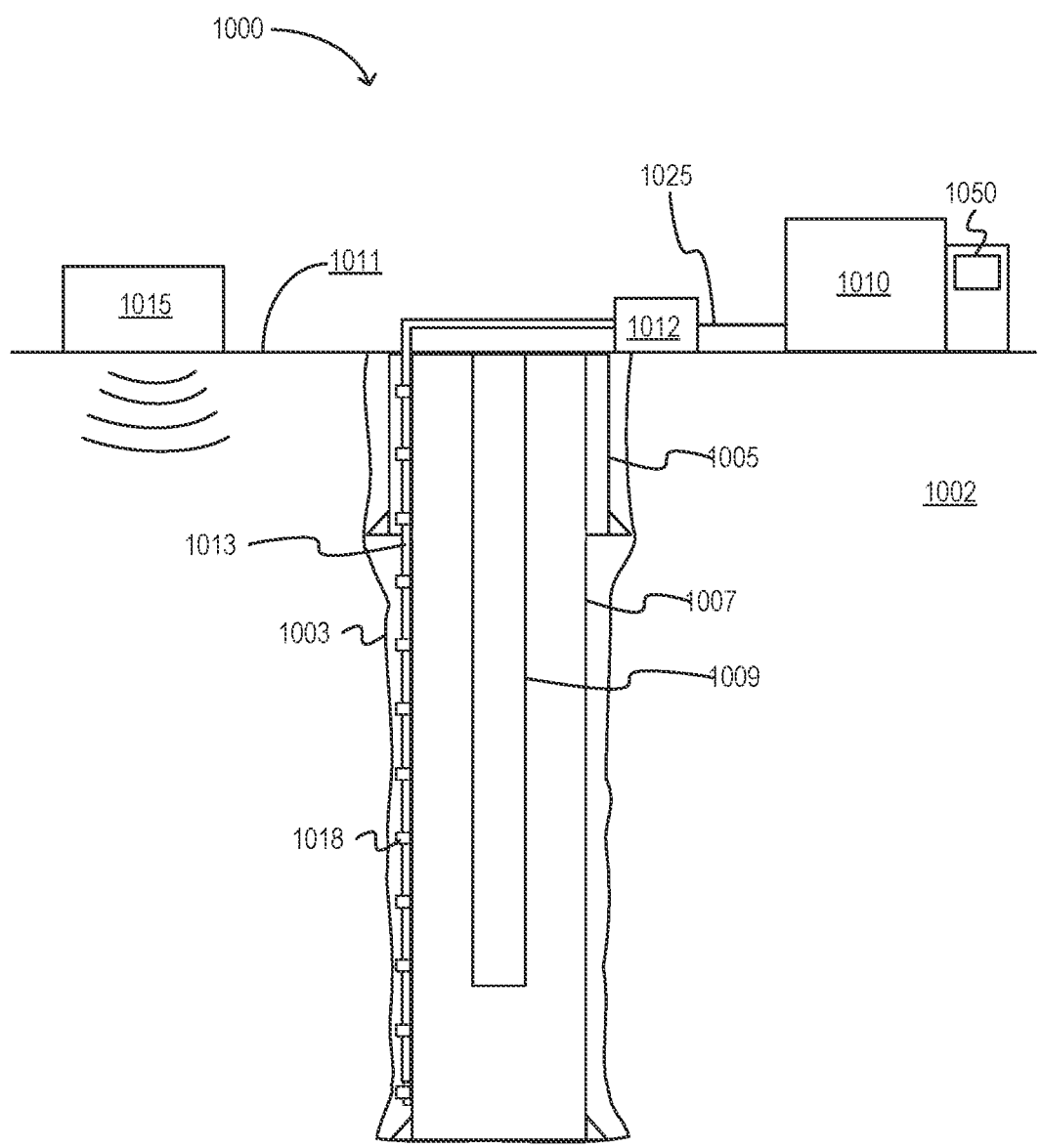
FIG. 10 depicts an example completion system that uses a hybrid EO cable fixed to the outside of a casing of a cased wellbore.

FIGS. 9-10 illustrate further variations of the system shown in FIG. 8. FIG. 9 depicts an example completion system 900 that uses a hybrid EO cable fixed to the outside of a tubing. A wellbore 903 has been drilled in the subterranean formation 902. The wellbore 903 can be a cased wellbore, e.g. a completed well (i.e. a well ready for production or injection following a drilling process) having a surface casing 905, a production casing 907 inside the surface casing 905, and a tubing 909 inside the production casing 907. In some embodiments, the tubing 909 can be a casing string, production string, or a work string, etc.

In one or more embodiments, the completion system 900 can be a DAS system used to detect seismic waves generated by a seismic source 915 at/near the surface 911 of the subterranean formation 902. The completion system includes a hybrid EO cable 913 having optical fiber(s) as described in examples above that is fixed to the outer perimeter of the tubing 909. Cross-coupling protectors 918 or other fasteners can be used to fix the hybrid EO cable 913 to the outer perimeter of the tubing 909. In some embodiments, cross-coupling protectors 918 or other fasteners can be also used to fix the hybrid EO cable 913 to the outer perimeter of the production casing 907 such that it functions as a permanently installed seismic sensor. A tubing tail 917 can also be fixed to the hybrid EO cable 913 and extend below the bottom of the tubing 909. The completion system 900 also includes a signal interrogation system 912 that includes a DAS interrogator. In some embodiments, the DAS interrogator in the signal interrogation system 912 can be directly coupled to the optical fiber(s) of the hybrid EO cable 913. Alternatively, the DAS interrogator can be coupled to a fiber stretcher module in the signal interrogation system 912, wherein the fiber stretcher module is coupled to the optical fiber(s) of the hybrid EO cable 913. The signal interrogation system 912 can receive DAS measurement values taken from and/or transmitted along the length of the optical fiber(s) of the hybrid EO cable 913

The DAS interrogator of the signal interrogation system 912 can be electrically connected to a digitizer to convert optically-transmitted measurements into digitized measurements. A computing device 910 can collect the digitized measurements from the signal interrogation system 912 using a connector 925. The computing device can have one or more processors and a memory device to analyze the measurements and graphically represent analysis results on the display device 950.

FIG. 10 depicts an example completion system 1000 that uses a hybrid EO cable fixed to the outside of a casing of a cased wellbore. A wellbore 1003 has been drilled in the subterranean formation 1002. The wellbore 1003 can be a completed well (i.e. a well ready for production or injection following a drilling process) having a surface casing 1005, a production casing 1007 inside the surface casing 1005, and a tubing 1009 inside the production casing 1007. In some embodiments, the tubing 1009 can be a casing string, production string, or a work string, etc.

In one or more embodiments, the completion system 1000 can be a DAS system used to detect seismic waves generated by a seismic source 1015 at/near the surface 1011 of the subterranean formation 1002. The completion system includes a hybrid EO cable 1013 having optical fiber(s) that is fixed to the outer perimeter of the production casing 1007. Cross-coupling protectors 1018 or other fasteners can be used to fix the hybrid EO cable 1013 to the outer perimeter of the production casing 1007. The completion system 1000 also includes a signal interrogation system 1012 that includes a DAS interrogator. In some embodiments, the DAS interrogator in the signal interrogation system 1012 can be directly coupled to the optical fiber(s) of the hybrid EO cable 1013. Alternatively, the DAS interrogator can be coupled to a fiber stretcher module in the signal interrogation system 1012, wherein the fiber stretcher module is coupled to the optical fiber(s) of the hybrid EO cable 1013. The signal interrogation system 1012 can receive DAS measurement values taken from and/or transmitted along the length of the optical fiber(s) of the hybrid EO cable 1013.

The DAS interrogator of the signal interrogation system 1012 can be electrically connected to a digitizer to convert optically-transmitted measurements into digitized measurements. A computing device 1010 can collect the digitized measurements from the signal interrogation system 1012 using a connector 1025. The computing device can have one or more processors and a memory device to analyze the measurements and graphically represent analysis results on the display device 1050.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A cable comprising:
   a protective jacket;
   a plurality of conductor bundles symmetrically arranged within the protective jacket; and
   bare optical fibers arranged within the protective jacket relative to the plurality of conductor bundles such that an orthogonal mode electrical field symmetry for the plurality of conductor bundles is retained.

2. The cable of claim 1, wherein the plurality of conductor bundles is configured to transmit at least one of communication and power.

3. The cable of claim 1, wherein the optical fibers are positioned in interstitial areas at least partially defined by the plurality of conductor bundles.

4. The cable of claim 3, wherein the interstitial areas are defined by the protective jacket and the conductor bundles.

5. The cable of claim 4, further comprising:
   an armor layer, wherein the protective jacket is sheathed in the armor layer; and
   additional optical fibers being symmetrically arranged in different interstitial areas at least partially defined by the armor layer and the protective jacket.

6. The cable of claim 1, wherein a first of the conductor bundles is centrally disposed within the cable.

7. The cable of claim 1, wherein the cable is to be coupled between a tool positioned in a wellbore and a device at a surface of the wellbore, wherein the plurality of conductor bundles is configured to electrically transmit at least one of communication and power between the tool positioned in the wellbore and the device at the surface of the wellbore.

8. A system comprising:
   a tool to be positioned in a wellbore;
   a device to be positioned at a surface of the wellbore; and
   a cable to couple the tool to the device, wherein the cable comprises,
   a protective jacket;
   a plurality of conductor bundles symmetrically arranged within the protective jacket; and
   bare optical fibers arranged within the protective jacket relative to the plurality of conductor bundles such that an orthogonal mode electrical field symmetry for the plurality of conductor bundles is retained.

9. The system of claim 8, wherein the plurality of conductor bundles is configured to transmit at least one of communication and power.

10. The system of claim 8, wherein the optical fibers are positioned in interstitial areas at least partially defined by the plurality of conductor bundles.

11. The system of claim 10, wherein the interstitial areas are defined by the protective jacket and the conductor bundles.

12. The system of claim 11, further comprising:
    an armor layer, wherein the protective jacket is sheathed in the armor layer; and
    additional optical fibers being symmetrically arranged in different interstitial areas at least partially defined by the armor layer and the protective jacket.

13. The system of claim 8, wherein a first of the conductor bundles is centrally disposed within the cable.

\* \* \* \* \*